Jan. 18, 1966    J. RADZIEJOWSKI    3,230,299
ELECTRICAL CABLE WITH CHEMICALLY BONDED RUBBER LAYERS
Original Filed July 18, 1962
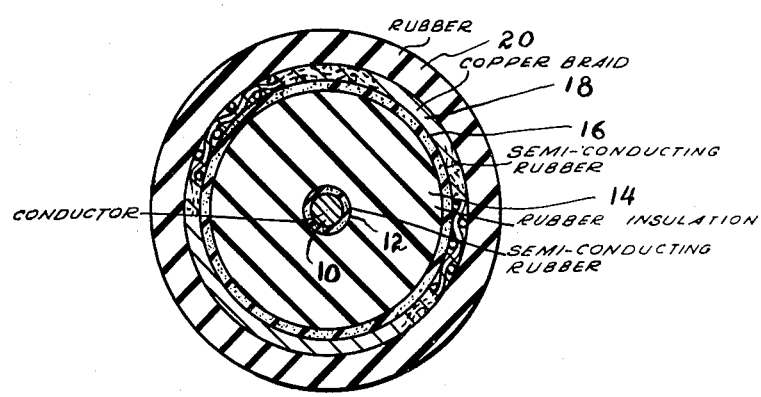
INVENTOR.
JERZY RADZIEJOWSKI
BY
ATTORNEYS

United States Patent Office 3,230,299
Patented Jan. 18, 1966

3,230,299
ELECTRICAL CABLE WITH CHEMICALLY
BONDED RUBBER LAYERS
Jerzy Radziejowski, Brookline, Mass., assignor to General Cable Corporation, New York, N.Y., a corporation of New Jersey
Original application July 18, 1962, Ser. No. 210,784, now Patent No. 3,187,071, dated June 1, 1965. Divided and this application July 25, 1963, Ser. No. 303,703
5 Claims. (Cl. 174—105)

The present application is a division of my pending application Serial No. 210,784, filed July 18, 1962, now Patent 3,187,071.

This invention relates to electrical cables and, more particularly, to improved electric cables produced by an improved method for applying adjacent insulation layers.

In most high voltage rubber insulated cables the insulation is applied in layers. In many cases, these layers will have different properties such as the inclusion of carbon particles in one or more layers to render the rubber semi-conducting. Adjacent rubber layers may have different physical attributes such as insulation of protective characteristics.

In any case, however, the inclusion of gas-filled spaces, commonly termed voids, between the interfaces of adjacent rubber layers must be studiously avoided. If a void exists at the interface between layers in high voltage cable, the electrical stress might result in electrical discharge in the gas-filled spaces.

Many schemes have been devised to eliminate any voids between interfaces by controlling the adhesion between layers so that the adjacent layers are bonded together. With such bonding, the voids within any given layer must be and can be controlled by extrusion techniques. The bonding which has been accomplished by utilizing tackifiers and adhesives to clean the surface to which bonding is to be made and thereafter applying a thin film of such material will promote a physical bond between the surface and the insulation applied thereto. However, the ionization level, that is the corana initiation voltage, of the resultant cables fabricated by these methods is far below the breakdown strength of the insulation and is, thus, a limitation. For example, if the breakdown strength of the insulation is of the order of 30 kv., the ionization level of cable fabricated with these bonded insulation layers will rarely exceed 4.5 kv.

It is an object of this invention to provide an improved cable having multi-layer insulation in which the layers of insulation are chemically bonded together thereby to increase the ionization level of the resultant cable.

Other objects and advantages of the invention will in part be obvious and in part appear hereinafter.

In accordance with these objects there is provided, in a preferred embodiment of this invention, an electrical cable having a conductor and at least two rubber layers applied thereto. The layers are chemically bonded together. The cable will achieve ionization levels of more than twice the value of cables constructed by the methods known to the art.

I have discovered that a void-free bond between rubber layers is obtained by using a bonding composition consisting of an organic peroxide and a conventional oil lubricant carrier. In fabricating a cable using extrusion techniques after a rubber strand shield has been extruded and vulcanized on a stranded conductor it is usually advisable to apply a lubricant to the surface of the vulcanized rubber base surface to facilitate its passing through the extruder guide tips in carrying out further extrusion. This lubricant is characterized by its ability to clean and tackify the surface of the prior extrusion without interfering with the extrusion being made and many commercial grades are available. I have found when an organic peroxide is incorporated into the oil lubricant, and the composition subsequently applied to the interfaces of the rubber surfaces at extrusion, that during vulcanization an improved bond is formed between the rubber layers providing a substantially void-free structure.

In accordance with the method of preparation of this cable, one layer of insulation is extruded on the cable and vulcanized thereon. The second layer of rubber is extruded on the vulcanized layer. An oil lubricant carrying approximately 7 to 15%, preferably 10%, by weight of an organic peroxide is applied to the surface of the vulcanized rubber at the point of extrusion of the adjacent layer. The extruded rubber layer is then vulcanized in conventional fashion.

During vulcanization, a chemical bond is formed between the layers of rubber as a result of the reaction with the peroxide, which reaction is promoted by the heat of the vulcanization. The reactivity of the vulcanized rubber is increased by the oxidizing action of the peroxides, facilitated by the swelling action of the oil.

The chemical bond between adjacent layers in multi-layer cable fabrication precludes voids and, in some cases, has resulted in a cable having an ionization level which is very close to the breakdown voltage of the cable insulation itself.

Having briefly described this invention, it will be described in greater detail in the following portions of the specification, which may be more clearly understood by reference to the accompanying drawing which is a cross section view of a cable fabricated in accordance with the present invention.

In FIG. 1, there is shown a cable having a stranded conductor 10 over which is applied a semi-conducting natural rubber compound 12 for strand shielding purposes, a natural rubber insulation layer 14, a semi-conducting rubber insulation shield 16, a copper braid 18, and a natural rubber jacket 20. The conductor shield 12, the insulation 14, and the insulation shield 16 are chemically bonded together at the interfaces. The resultant cable shows an ionization level consistent in excess of 12.5 kv. and on occasion going as high as 30 kv. which is just below the breakdown voltage of the cable insulation itself. This is surprisingly higher than the normal ionization level of 4.5 kv.

In accordance with the method of this invention, the semi-conducting strand shielding 12 is extruded over the stranded conductor. The strand shield is then vulcanized in conventional fashion. The insulation layer 14 is then extruded upon the shield 12 applying a lubricant containing organic peroxide to the interface of the surface at extrusion.

Suitable lubricants available commercially include "Dispersing Oil No. 10" by Allied Chemical and Dye Corporation and "4039-Y Reclaiming Oil" by C. P. Hall Company.

"Dispersing Oil No. 10" is a brand name for a coal-tar oil distillate having the following specification:

| | |
|---|---|
| S.G. at 25° C. | 1.00–1.05 |
| Water _____ percent by volume (max.) | 0.3 |
| Distillation: | |
| First drop _____ ° C. (max.) | 210 |
| to 225° C. _____ percent by volume (max.) | 10 |
| to 280° C. _____ percent by volume (min.) | 90 |
| Dry point _____ ° C. (max.) | 320 |

"4039–Y Reclaiming Oil" has the following specification:

| | |
|---|---|
| Color | Dark brown. |
| S.G. at 60° F. | 0.940±0.004. |
| Viscosity | 40±5 Saybolt Universal seconds at 100° F. |
| Flash point | 180° F. (min.). |
| Weight per gallon | 7.80 lbs./gal. (min.). |

The true characteristics of these oil lubricants by means of which they lend themselves to the accomplishment of the objectives of this invention is that the oil acts as a cleaning agent, tackifier through its solvent and swelling action, peroxide carrier and lubricant, but it does not enter into any chemical reactions.

Generally, any organic peroxide utilizable as a vulcanizing agent may be incorporated into oil lubricant compositions. These include organic peroxides in which hydrogen atoms have been replaced by organic groups such as alkyl, aralkyl, acyl, aroyl, etc., are dicumyl peroxide, di-t-butyl peroxide, dibenzoyl peroxide, dialkyl peroxides and percarbonate esters, etc.

I have found that the smoothly reacting and safe dicumyl peroxide is particularly suitable for incorporation into the oil composition. A high purity commercial grade of dicumyl peroxide is "Di-Cup" by Hercules Powder Company, Inc.

Typical compositions used in accordance with this invention are summarized in the following table:

TABLE

| | Parts by weight | |
|---|---|---|
| "Dispersing Oil No. 10" | 100 | |
| "4039–Y Reclaiming Oil" | | 100 |
| Dicumyl peroxide ("Di-Cup") | 10 | 10 |

The dicumyl peroxide is blended with the oil and in accordance with this invention subsequently applied to the interfaces of the rubber surfaces at extrusion and thereafter vulcanization carried out in the usual manner.

Typically the oil lubricant composition employed will carry from about 7% to about 15% of an organic peroxide incorporated therein. Preferably, an amount of organic peroxide equal to 10% of the weight of the oil lubricant used is dissolved in the oil.

Accordingly, dicumyl peroxide equal approximately 10%, by weight of oil is dissolved in the oil and applied to the interface of vulcanized strand shield 12 and insulation layer 14. The insulation was then vulcanized in the usual fashion. During vulcanization, the dispersing oil acts as a cleaning agent, a tackifier through its solvent and swelling action, a lubricant and, of course, a peroxide carrier. The oil does not enter into the chemical reaction between strand shield 12 and insulation layer 14.

Thereafter, in a similar fashion, the bonding composition is applied to the interface of vulcanized insulation layer 14 and insulating shield 16 applied by further extrusion techniques and again vulcanized in the usual fashion.

Therefore, in a multi-layer construction, by each chemical bonding using organic peroxides and vulcanization, it is possible to obtain a void-free bond between strand shield, insulation layer and insulating shield and have a void-free structure to enable high voltages to be handled with freedom from ionization which otherwise would ultimately cause premature failure of the cable.

It is to be understood that in accordance with the invention, organic peroxides will promote a bonding formation between natural rubber, SBR (styrene-butadiene rubber) CR (neoprene), etc. In general, the bond can be formed between natural rubber as well as synthetic rubbers which are peroxide curable. Naturally, rubbers such as butyl rubber and poly-isobutylene which are depolymerized by treatment with peroxides and can not be cured by peroxides would not be utilized in fabricating cable according to the present invention.

This invention may be variously modified and embodied within the scope of the subjoined claims.

What is claimed is:

1. An insulated electrical conductor having a void-free multi-layer covering thereon, said covering comprising at least two concentric layers of vulcanized peroxide-curable rubber compounds arranged one directly over and in contact with the other, the said layers being bonded together at their interface without voids by chemical cross-linking the layers of rubber compounds at and adjacent to their interfaces being tackified and swelled by an oil lubricant chemically inert to the chemical cross-linking bond and non-volatile at the vulcanization temperature, and the interfaces being chemically cross-linked by the reaction product of the tackified and swelled rubber with peroxide curing agent carried by the oil and localized between the interfaces of the layers of rubber compounds.

2. An insulated electrical conductor having a void-free multi-layer covering thereon, said cover comprising at least two concentric layers of vulcanized peroxide-curable rubber compounds arranged one directly over and in contact with the other, the said layers being bonded together at their interface without voids by chemical cross-linking, the rubber layers being bonded by a bonding-promoting composition consisting of an inert oil lubricant and an organic peroxide, the oil lubricant having a distilling temperature higher than the temperature of the vulcanization whereby the multi-layer cover remains a void-free structure.

3. An insulated electrical conductor in accordance with claim 2 with the rubber layers being bonded by a bonding composition in which the organic peroxide is dicumyl peroxide.

4. An insulated electrical conductor in accordance with claim 1 in which the said layers comprise a first conductor shielding layer of semi-conducting peroxide-curable rubber compound on the conductor, and a second layer of peroxide-curable rubber insulating compound over the conductor shielding layer.

5. An insulated electrical conductor in accordance with claim 4 in which there is a third layer, of semi-conducting peroxide-curable rubber compound, over and in contact with the said second layer, the third layer being bonded to the said second layer at their interface without voids by chemical cross-linking.

References Cited by the Examiner
UNITED STATES PATENTS

| | | |
|---|---|---|
| 2,081,517 | 5/1937 | Van Hoffen. |
| 2,304,210 | 2/1940 | Scott et al. |
| 2,936,261 | 5/1955 | Cole. |

FOREIGN PATENTS

| | | |
|---|---|---|
| 861,839 | 3/1961 | Great Britain. |

BERNARD A. GILHEANY, *Primary Examiner.*

DARRELL L. CLAY, LARAMIE E. ASKIN,
*Examiners.*

D. A. KETTLESTRINGS, *Assistant Examiner.*